United States Patent
Ventura et al.

(10) Patent No.: US 10,421,047 B2
(45) Date of Patent: Sep. 24, 2019

(54) COMPOSITE MEMBRANES COMPRISING NANOPARTICLES FOR LIQUID FILTRATION

(71) Applicant: Baker Hughes, a GE company, LLC, Houston, TX (US)

(72) Inventors: Darryl N. Ventura, Houston, TX (US); Sankaran Murugesan, Katy, TX (US); Oleksandr V. Kuznetsov, Manvel, TX (US); Valery N. Khabashesku, Houston, TX (US); Oleg A. Mazyar, Katy, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 27 days.

(21) Appl. No.: 15/887,255

(22) Filed: Feb. 2, 2018

(65) Prior Publication Data
US 2018/0221831 A1   Aug. 9, 2018

Related U.S. Application Data

(60) Provisional application No. 62/455,044, filed on Feb. 6, 2017.

(51) Int. Cl.
*B01D 63/10* (2006.01)
*B01D 67/00* (2006.01)
(Continued)

(52) U.S. Cl.
CPC ....... *B01D 71/021* (2013.01); *B01D 67/0041* (2013.01); *B01D 67/0046* (2013.01);
(Continued)

(58) Field of Classification Search
None
See application file for complete search history.

(56) References Cited

U.S. PATENT DOCUMENTS

| 7,708,816 B2 | 5/2010 | Holmes et al. |
| 8,317,978 B1 * | 11/2012 | Manning ................ D21H 13/50 |
| | | 162/152 |

(Continued)

FOREIGN PATENT DOCUMENTS

WO    2014194228 A1    12/2014

OTHER PUBLICATIONS

Panpan Gai et al , "A ternary hybrid of carbon nanotubes/graphitic carbon nitride nanosheets/gold nanoparticles used as robust substrate electrodes in enzyme biofuel cells", ChemComm, 2015, 51, 14735.*

(Continued)

*Primary Examiner* — Krishnan S Menon
(74) *Attorney, Agent, or Firm* — TraskBritt

(57) ABSTRACT

A filter membrane includes carbon nanotubes and carbon nitride nanoparticles. Inter-particle atomic interactions between the carbon nanotubes and the carbon nitride nanoparticles bind the carbon nanotubes and the carbon nitride nanoparticles together. A filter cartridge includes such a filter membrane disposed within an outer housing between a fluid inlet and a fluid outlet such that fluid passing through the outer housing between the fluid inlet and the fluid outlet passes through the filter membrane. Such filter membranes may be formed by dispersing carbon nanotubes and carbon nitride nanoparticles in a liquid to form a suspension, and passing the suspension through a filter to deposit the nanotubes and nanoparticles on the filter. Liquid may be filtered by causing the liquid to pass through such a filter membrane.

20 Claims, 2 Drawing Sheets

(51) Int. Cl.
 *B01D 69/02* (2006.01)
 *B01D 69/14* (2006.01)
 *B01D 71/02* (2006.01)
 *C02F 1/44* (2006.01)

(52) U.S. Cl.
 CPC .......... *B01D 69/141* (2013.01); *B01D 71/02* (2013.01); *C02F 1/44* (2013.01); *B01D 63/10* (2013.01); *B01D 69/02* (2013.01); *B01D 2323/30* (2013.01); *B01D 2325/04* (2013.01)

(56) References Cited

U.S. PATENT DOCUMENTS

| | | |
|---|---|---|
| 8,398,950 B2 | 3/2013 | Khabashesku |
| 8,940,173 B2 | 1/2015 | Bakajin et al. |
| 9,409,131 B2 | 8/2016 | Miller |
| 9,428,985 B2 | 8/2016 | Mazyar et al. |
| 2011/0062076 A1 | 3/2011 | Lee et al. |
| 2012/0234694 A1 | 9/2012 | Vecitis et al. |
| 2013/0299410 A1 | 11/2013 | Lee et al. |
| 2014/0272183 A1 | 9/2014 | Cooper et al. |
| 2015/0251930 A1 | 9/2015 | Dufresne et al. |
| 2016/0107126 A1 | 4/2016 | Cates |
| 2016/0348462 A1 | 12/2016 | Mazyar et al. |
| 2017/0361376 A1* | 12/2017 | Murugesan ............... B22F 1/02 |

OTHER PUBLICATIONS

International Search Report for International Application No. PCT/US2018/016625 dated May 15, 2018, 4 pages.

International Written Opinion for International Application No. PCT/US2018/016625 dated May 15, 2018, 8 pages.

Ma et al., Graphitic Carbon Nitride Nanosheet-Carbon Nanotube Three-Dimensional Porous Composites as High-Perfomance Oxygen Evolution Electrocatalysts, Angewandte Chemie International Edition, (2014), vol. 53, pp. 7281-7285 (abstract only).

Khabashesku et al. Carbonitride Nanomaterials, Thin Films, and Solids, Advanced Engineering Materials, vol. 4, No. 9, (2002), pp. 671-675.

Khabashesku et al., Powder Syntheisi and Characterization of Amorphous Carbon Nitride, Chem. Mater., vol. 12, (2000) pp. 3264-3270.

Ventura et al., Thin Film Substrates Including Crosslinked Carbon Nanotubes and Related Methods, U.S. Appl. No. 62/444,872, filed Jan. 11, 2017.

Zimmerman et al., Synthesis of Spherical Carbon Nitride Nanostructures, Nano Letters, vol. 1, No. 12, (2001), pp. 731-734.

* cited by examiner

COMPOSITE MEMBRANES COMPRISING NANOPARTICLES FOR LIQUID FILTRATION

CROSS-REFERENCE TO RELATED APPLICATION

This application claims the benefit under 35 U.S.C. § 119(e) of U.S. Provisional Patent Application Ser. No. 62/455,044, filed Feb. 6, 2017, the disclosure of which is hereby incorporated herein in its entirety by this reference.

TECHNICAL FIELD

Embodiments of the disclosure relate generally to thin composite membranes that include carbon nanotubes and carbon nitride nanoparticles, to filter cartridges including such composite membranes, and to methods of making and using such membranes and filter cartridges for liquid filtration.

BACKGROUND

There are many industrial processes that generate waste water or other liquids that must be filtered and purified prior to returning the water to the environment or reusing the water. For example, in the oil and gas industry, wellbore drilling, completion, and production can generate contaminated liquids. To enhance wellbore production, liquid is frequently injected at high pressure into subterranean rocks, boreholes, etc., to force open existing fissures in the formation and enable extraction of oil or gas from the wellbore. This process is referred to as "hydraulic fracturing" or "fracking," and often generates waste water (referred to in the industry as "flowback" water) that includes sediment and other contaminants. Flowback water may be produced in large quantities (about 40-50 barrels per day) within a short span of time after a hydraulic fracturing job is completed. Flowback water mainly consists of clay particles, chemical additives, dissolved metal ions, and total dissolved solids (TDS) with its content and concentration depending upon geography. Reusing this water continues to be a great industry challenge.

New technology is needed to treat flowback water so that it can be reused directly or blended with fresh water. On-site treatment and recycling is a desired solution, and several technologies have been explored for the water treatment process including the use of chemical additives and pH adjustment to cause precipitation of metal sulfides. However, these methods do not remove all the salt contaminants. Other alternatives involving thermal evaporation techniques are not economically viable on a large scale. Additionally, technologies utilizing reverse osmosis have drawbacks in that existing membranes can be easily fouled at higher contaminant concentrations.

Conventional filtration membranes, such as those found in spiral-wound filters, comprise of a variety of materials including fluoropolymers, polyamides, polyethersulfones, and polyacrylonitriles. However, such materials can be limited due to their physical properties.

BRIEF SUMMARY

In some embodiments, the present disclosure includes a filter membrane comprising carbon nanotubes and carbon nitride nanoparticles. Inter-particle atomic interactions between the carbon nanotubes and the carbon nitride nanoparticles bind the carbon nanotubes and the carbon nitride nanoparticles together.

Additional embodiments of the present disclosure include a filter cartridge having an outer housing, a fluid inlet leading into the outer housing, a fluid outlet leading out from the outer housing, and a filter membrane disposed between the fluid inlet and the fluid outlet and located such that fluid passing through the outer housing between the fluid inlet and the fluid outlet passes through the filter membrane. The filter membrane includes carbon nanotubes and carbon nitride nanoparticles. Inter-particle atomic interactions between the carbon nanotubes and the carbon nitride nanoparticles bind the carbon nanotubes and the carbon nitride nanoparticles together.

In additional embodiments, the present disclosure includes methods of making a filter membrane in which carbon nanotubes and carbon nitride nanoparticles are dispersed in a liquid to form a suspension, and the suspension is passed through a filter so as to deposit the carbon nanotubes and the carbon nitride nanoparticles on the filter and form the filter membrane on the filter.

In yet further embodiments of the present disclosure, methods of filtering liquid include passing liquid through such a filter membrane or filter cartridge.

BRIEF DESCRIPTION OF THE DRAWINGS

While the specification concludes with claims particularly pointing out and distinctly claiming what are regarded as embodiments of the present disclosure, various features and advantages of disclosed embodiments may be more readily ascertained from the following description when read with reference to the accompanying drawings, in which:

FIG. 2 is a cross-sectional side view illustrating a suspension including carbon nanotubes and carbon nitride nanoparticles disposed within a filter device;

FIG. 3 is a cross-sectional side view like that of FIG. 2 and illustrate a filter membrane as described herein disposed on a filter of the filter device after causing the liquid of the suspension to pass through the filter;

DETAILED DESCRIPTION

Illustrations presented herein are not meant to be actual views of any particular material or component, but are merely idealized representations that are employed to describe embodiments of the disclosure.

Figure 1:
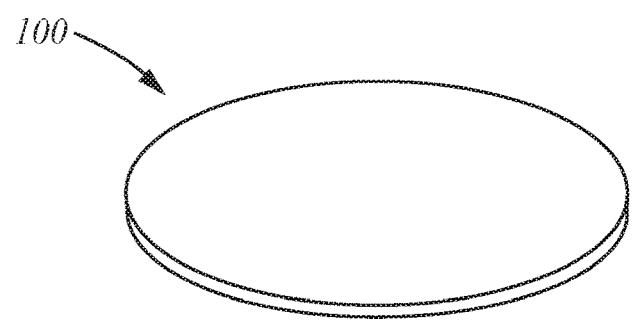
FIG. 1 is a perspective view of an embodiment of a filter membrane according to the present disclosure.

FIG. 1 illustrates an embodiment of a filter membrane 100 of the present disclosure. The filter membrane 100 includes a plurality of carbon nanotubes (CNTs) and a plurality of carbon nitride nanoparticles. In some embodiments, the filter membrane 100 may consist essentially of CNTs and a plurality of carbon nitride nanoparticles. Inter-particle atomic interactions between the CNTs and the carbon nitride bind the CNTs and the carbon nitride nanoparticles together.

As known in the art, a CNT is a tubular molecule in which the wall or walls of the tubular molecule comprise a graphene sheet. The graphene sheet is a single atomic layer of carbon atoms, wherein the carbon atoms are arranged in interconnected rings each having six (6) carbon atoms arranged in a hexagonal structure. The atomic bonding state of carbon in carbon nanotubes is $sp^2$, with each carbon atom joined to three neighbors, as in graphite. As known in the art, the hexagonal carbon rings of CNTs may be arranged in different orientations, and CNTs may be "zig-zag" CNTs, "armchair" CNTs, or "chiral" CNTs. The CNTs of the filter membrane 100 may comprise any type of CNT.

The CNTs may comprise single wall CNTs or multi-wall CNTs, or a combination thereof. In addition, the CNTs may have any practical diameter, any practical length, and any practical length-to-diameter ratio.

The carbon nitride nanoparticles may comprise $CN_x$ nanoparticles, wherein x is between 0.05 and 1.33. The carbon nitride nanoparticles may comprise any of the carbon nitride particles disclosed in, and may be formed by the methods disclosed in the following references, the contents of which are incorporated herein in their entireties by this reference: V. N. Khabashesku et al., *Cabonitride Nanomaterials, Thin Films, and Solids,* Advanced Engineering Materials 2002, 4, No. 9, pp. 671-675; V. N. Khabashesku et al., *Powder Synthesis and Characterization of Amorphous Carbon Nitride,* Chem. Mater. 2000, 12, pp. 3264-3270; and J. L. Zimmerman et al., *Synthesis of Spherical Carbon Nitride Nanostructures,* Nano Letters 2001, Vol. 1, No. 12, pp. 731-734.

In some embodiments, the carbon nitride nanoparticles may comprise spherical carbon nitride nanoparticles comprising triazine (e.g., 1,3,5-triazine) rings. Such spherical carbon nitride nanoparticles may be hollow cage-like, fused-ring molecules similar to buckminsterfullerene, but wherein the rings of the cage comprise interconnected triazine rings. In such embodiments, the inter-particle atomic interactions between the carbon nitride nanoparticles and the CNTs may comprise pi-pi stacking interactions between the aromatic rings in the CNTs and the carbon nitride nanoparticles. In such embodiments, the carbon nitride nanoparticles may be characterized as crosslinkers that crosslink the CNTs to one another so as to form the filter membrane 100.

With continued reference to FIG. 1, the CNTs may constitute between about 1% and 99% by weight of the filter membrane 100, between about 10% and about 90% by weight of the filter membrane 100, between about 25% and about 80% by weight of the filter membrane 100, or between about 50% and about 75% of the filter membrane 100. The carbon nitride nanoparticles may constitute between about 1% and 99% by weight of the filter membrane 100, between about 10% and about 90% by weight of the filter membrane 100, between about 20% and about 75% by weight of the filter membrane 100, or between about 25% and about 50% by weight of the filter membrane 100.

The filter membrane 100 may have a thickness of, for example, between about one micron (1 μm) and about fifty microns (50 μm). The filter membrane 100 may be relatively flexible.

Figure 2:
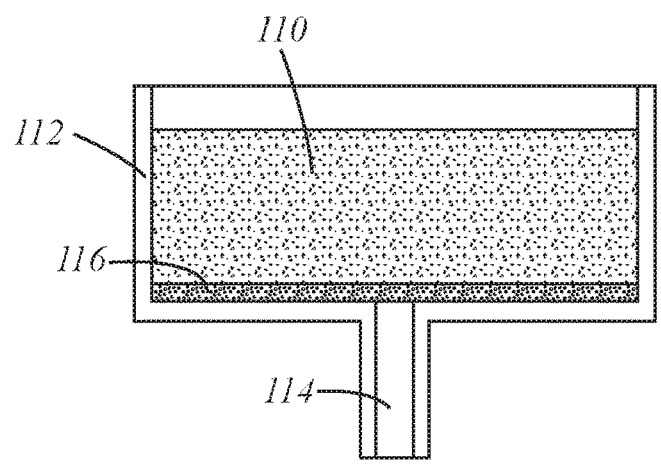
FIGS. 2 and 3 illustrate the formation of a filter membrane in accordance with embodiments of the present disclosure.
Figure 3:
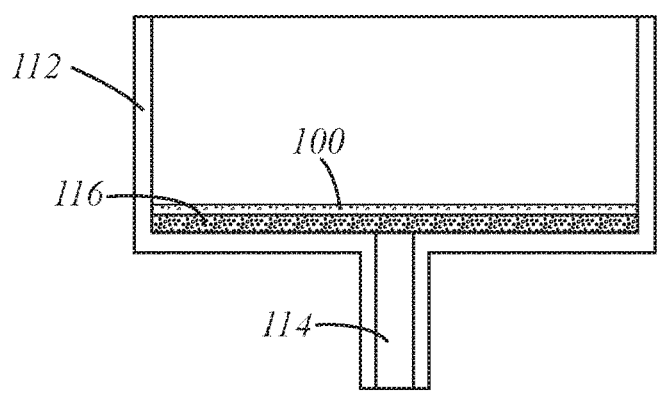
Figure 4:
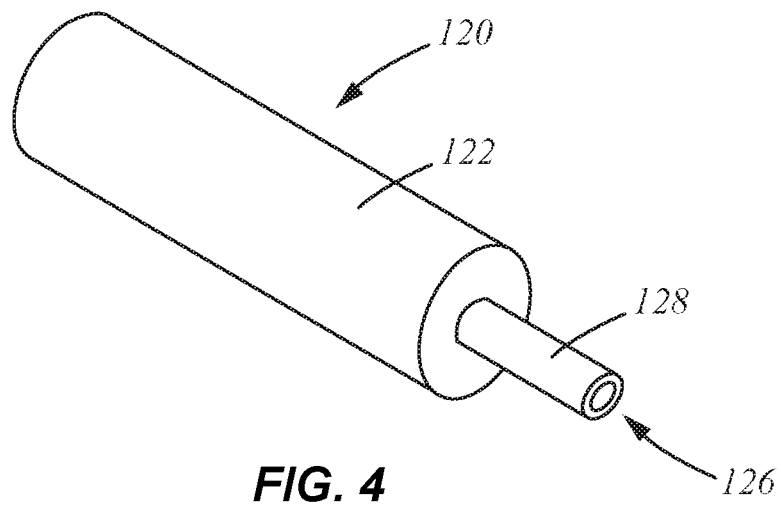
FIG. 4 is a perspective view of an embodiment of a filter cartridge according to the present disclosure.

FIGS. 2 and 3 illustrate a method that may be used to form a filter membrane 100 as described herein. Referring to FIG. 2, the CNTs and carbon nitride nanoparticles may be dispersed in a liquid to form a suspension 110, which may be placed in a container 112. The container 112 may have a fluid outlet 114 at a lower end thereof, as shown in FIG. 4. A filter 116 may be disposed in the container 112 over the fluid outlet 114. The filter 116 may be configured to allow the liquid of the suspension 110 to pass therethrough, while preventing the CNTs and carbon nitride nanoparticles from passing through the filter 116. The suspension 110 may be placed over the filter 116 within the container 112. The suspension 110 may be caused to pass through the filter 116 so as to deposit the CNTs and carbon nitride nanoparticles on the filter and form the filter membrane 100 thereon, as illustrated in FIG. 3. The suspension 110 may be caused to pass through the filter 116 due to gravity, by applying a vacuum on the fluid outlet 114, and/or by pressuring the space over the suspension 110 within the container 112. After forming the filter membrane 100 on the filter 116, the filter membrane 100 may optionally be separated and removed from the filter 116.

As previously mentioned, in some embodiments, the CNTs may be cross-linked with one another by the carbon nitride nanoparticles. In other embodiments, the CNTs may be cross-linked with one another using other cross-linkers, and the carbon nitride nanoparticles may simple be bonded or otherwise attracted to the CNTs (e.g., by pi-pi stacking interactions). As non-limiting examples, the CNTs may be cross-linked with one another in any of the manners disclosed in U.S. patent application Ser. No. 62/444,872, which was filed Jan. 11, 2017 in the name of Ventura et al., the entire contents of which are incorporated herein by this reference. In some embodiments, the carbon nitride nanoparticles may be the cross-linking members between the CNTs. In other embodiments, however, the CNTs may be cross-linked with one other using other cross-linkers, and the carbon nitride nanoparticles may be bonded or otherwise attracted to the cross-linked CNTs.

As described in U.S. patent application Ser. No. 62/444,872, the CNTs may be exposed to a cross-linker, such as in solution, to cross-link the CNTs. The CNTs and cross-linker may be combined in an appropriate solvent, such as water, an organic solvent, or combinations thereof. The cross-linked carbon nanotubes may be configured as carbon nanotube mats or in other configurations. As used herein, the term "carbon nanotube mat" means and includes a sheet of carbon nanotubes. The carbon nanotube mat may include a plurality of randomly oriented carbon nanotubes. The carbon nanotube mats may have a thickness of between, for example, about 50 μm and about 500 μm, such as between about 100 μm and about 400 μm, or between about 200 μm and about 300 μm. The carbon nanotube mats including the cross-linked CNTs may be formed by combining components in solution and recovering the cross-linked CNTs by simple filtration-from-suspension techniques. A suspension containing the cross-linked CNTs may be filtered, such as by vacuum filtration, to recover the cross-linked CNTs. The cross-linked CNTs may be disposed on or applied to the support substrate. The support substrate may be a solid support or a flexible, free standing support. Thus, industrially viable quantities of the cross-linked CNTs may be easily formed. Cross-linking of the CNTs may be conducted using multivalent cations, pi-pi stacking, covalent bonding, or electrostatic interactions. The cross-linker may be an atomic element, a chemical compound, a functional group, or a bond between the CNTs. The resulting carbon nanotube mat including the cross-linked CNTs may be flexible and exhibit good mechanical properties for use as a filter membrane.

The cross-linker for the CNTs may be a cation source compound, a pi-orbital source compound, a cross-linking agent, or metal nanoparticles. Nanoparticles of the cross-linker may be used, such as having an average particle size of from greater than or equal to about 1 nm to less than or equal to about 50 nm, from greater than or equal to about 1 nm to less than or equal to about 20 nm, or from greater than or equal to about 1 nm to less than or equal to about 10 nm. The CNTs may have a relatively larger particle size than the particle size of the cross-linker, enabling formation of a small amount of the cross-linker between the CNTs.

The CNTs may be functionalized, such as with one or more functional groups formulated and configured to bond, react, or otherwise interact with the cross-linker or with other CNTs. By way of nonlimiting example, the functional groups include amine groups, carboxyl groups (—COOH), thiol groups, fluorine or fluorinated functional groups, hydroxyl groups, or combinations thereof. The CNTs may be commercially available, such as from Nanocyl SA (Sambreville, Belgium) or MER Corporation (Tucson, Ariz.), or may be produced by conventional techniques. Commercially available CNTs may be used in their as-received form or may be functionalized, such as with carboxylate or other functional groups. Carboxylated CNTs may be produced, for example, by reacting the CNTs with at least one of nitric acid and sulfuric acid.

In some embodiments, the carbon nanotube mat includes CNTs cross-linked by multivalent cations. The multivalent cation may be obtained from a multivalent cation source compound. As used herein, the term "multivalent cation source compound" means and includes a chemical compound that includes a multivalent cation and a corresponding anion. The multivalent cation is formulated to react and cross-link with the CNTs. The carbon nanotube mat may be formed by cross-linking the CNTs with the cation source compound. The CNTs are functionalized with a functional group that is reactive with the multivalent cation of the cation source compound. The functional groups on the CNTs may be formulated to react with the multivalent cation by an ion exchange reaction. The multivalent cation may be a divalent ($2^+$) or higher cation, such as zinc, magnesium, calcium, aluminum, titanium, zirconium, niobium, or combinations thereof. The multivalent cation source compound may be a metal oxide, e.g., zinc oxide, MgO, CaO, $Al_2O_3$, a metal alkoxide, e.g., titanium isopropoxide, titanium ethoxide, zirconium ethoxide, aluminum isopropoxide, niobium ethoxide, or other oxide, salt, or complex of the multivalent cation, or combinations thereof. The multivalent cation source compound may also be an acetate of the multivalent cation, ammonium zirconium carbonate, a zirconium (IV) butoxide, titanium chloride, or combinations thereof. The multivalent cation source compound may have an average particle size of from greater than or equal to about 1 nm to less than or equal to about 50 nm, from greater than or equal to about 1 nm to less than or equal to about 20 nm, or from greater than or equal to about 1 nm to less than or equal to about 10 nm. Without being bound to any theory, it may be desirable to use divalent cations in the multivalent cation source compound due to their relative size difference compared to the CNTs. Higher valency cations may be used in the multivalent cation source compound. However, their relative size difference compared to the CNTs will be smaller, so the CNTs may be more difficult to cross-link with higher valency cations.

In one embodiment, the CNTs are functionalized with carboxylate groups and the multivalent cation source compound is zinc oxide. During cross-linking, the zinc oxide reacts with the carboxylate groups of the CNTs, resulting in cross-linking of the CNTs.

To form the cross-linked CNTs, the CNTs and the cation source compound may be combined in solution with mixing (e.g., stirring). The CNTs and the multivalent cation source compound may be reacted in solution for a sufficient amount of time for the cation of the multivalent cation source compound to react with the functional groups of the CNTs. By way of example only, the CNTs and the multivalent cation source compound may be reacted for at least about 1 hour, such as for at least about 2 hours, at least about 3 hours, at least about 4 hours, at least about 5 hours, or greater. The CNTs and the multivalent cation source compound may be reacted with mixing at room temperature (e.g., between about 20° C. and about 25° C.). To increase the rate of reaction, the CNTs and the multivalent cation source compound may be combined with mixing at an elevated temperature, such as at a temperature of between about 30° C. and about 100° C. The temperature may be greater than about 30° C., greater than about 40° C., greater than about 50° C., greater than about 60° C., greater than about 70° C., greater than about 80° C., or greater than about 90° C. The CNTs and the multivalent cation source compound may be combined in an appropriate organic solvent (e.g., acetic acid, an anhydride of acetic acid, propionic acid, an anhydride of propionic acid, isobutyric acid, an anhydride of isobutyric acid), or combinations thereof. The CNTs may be present in the solution in excess compared to the multivalent cation source compound, such as at a weight ratio of greater than about 2:1 CNTs:multivalent cation source compound, greater than about 5:1 CNTs:multivalent cation source compound, or greater than about 10:1 CNTs:multivalent cation source compound.

As the CNTs and multivalent cation source compound react, the solution may change to a suspension. After the CNTs and the multivalent cation source compound have reacted for a sufficient amount of time to cross-link the CNTs, the cross-linked CNTs may be recovered from the suspension. By way of example only, the cross-linked CNTs may be filtered from the suspension and dried. By filtering the cross-linked CNTs, industrially viable amounts of the cross-linked CNTs may be easily produced. The cross-linked CNTs may then be disposed on or applied to a support substrate to form the carbon nanotube mat.

In another embodiment, the carbon nanotube mat includes CNTs cross-linked by a pi-orbital source compound. The CNTs may be cross-linked by pi-pi stacking with the pi-orbital source compound. In some embodiments, the pi-orbital source compound may be the carbon nitride nanoparticles of the filter membrane. In other embodiments, the pi-orbital source compound may be any compound having pi-orbitals including, but not limited to, graphene, a protein, or combinations thereof. The pi-orbital source compound may have an average particle size of less than about 50 nm, less than about 20 nm, or less than about 10 nm. The average particle size of the pi-orbital source compound may range from greater than or equal to about 1 nm to less than or equal to about 50 nm, from greater than or equal to about 1 nm to less than or equal to about 20 nm, or from greater than or equal to about 1 nm to less than or equal to about 10 nm. The pi-orbitals of the pi-orbital source compound overlap and stack with pi-orbitals of the CNTs, cross-linking the CNTs and forming the cross-linked CNTs.

In one embodiment, the CNTs are reacted with $CN_x$ or graphene. The pi-orbitals of the $CN_x$ or graphene react with the pi-orbitals of the CNTs, resulting in cross-linking of the CNTs.

To form the cross-linked CNTs, the CNTs and the pi-orbital source compound may be combined in solution with mixing (e.g., stirring). The CNTs and the pi-orbital source compound may be reacted in solution for a sufficient amount of time for the pi-orbitals of the CNTs and the pi-orbitals of the pi-orbital source compound to overlap and stack. By way of example only, the CNTs and the pi-orbital source compound may be reacted for at least about 1 hour, such as for at least about 2 hours, at least about 3 hours, at least about 4 hours, at least about 5 hours, or greater. The CNTs and the pi-orbital source compound may be reacted with mixing at room temperature (e.g., between about 20° C. and about 25° C.). To increase the rate of reaction, the CNTs and the pi-orbital source compound may be combined with mixing at an elevated temperature, such as at a temperature of between about 30° C. and about 100° C. The temperature may be greater than about 30° C., greater than about 40° C., greater than about 50° C., greater than about 60° C., greater than about 70° C., greater than about 80° C., or greater than about 90° C. Sonication may, optionally, be used to sufficiently disperse the pi-orbital source compound and CNTs in the solution. The CNTs and the pi-orbital source compound may be combined in an appropriate solvent, such as water, an organic solvent, or combinations thereof. The CNTs may be present in the solution in excess compared to the pi-orbital source compound, such as at a weight ratio of greater than about 2:1 CNTs:pi-orbital source compound, greater than about 5:1 CNTs:pi-orbital source compound, or greater than about 10:1 CNTs:pi-orbital source compound.

As the CNTs and pi-orbital source compound react, the solution may change to a suspension. After the CNTs and the pi-orbital source compound have reacted for a sufficient amount of time to cross-link the CNTs, the cross-linked CNTs may be recovered from the suspension. By way of example only, the cross-linked CNTs may be filtered from the suspension and dried. By filtering the cross-linked CNTs, industrially viable amounts of cross-linked CNTs may be easily produced. The cross-linked CNTs may then be disposed on or applied to support substrate to form the carbon nanotube mat.

In yet another embodiment, the carbon nanotube mat includes CNTs cross-linked by covalent bonds formed between the CNTs and the cross-linking agent. The CNTs may be functionalized with a heteroatom-containing group, which reacts with and covalently bonds to the cross-linking agent. The carbon nanotube mat may be formed by cross-linking the CNTs with the cross-linking agent. By way of example only, the heteroatom of the heteroatom-containing group may be sulfur or nitrogen, and reacts with the cross-linking agent. The cross-linking agent may include, but is not limited to, benzoquinone, an oligothiophene, an oligoaniline, phenylene sulfide, pyrrole, sulfur, a peroxide, urethane, a metallic oxide, boron oxide, acetoxysilane, an alkoxysilane, or combinations thereof. The cross-linking agent may have an average particle size of less than or equal to about 50 nm, less than or equal to about 20 nm, or less than or equal to about 10 nm, such as from greater than or equal to about 1 nm to less than or equal to about 50 nm, from greater than or equal to about 1 nm to less than or equal to about 20 nm, or from greater than or equal to about 1 nm to less than or equal to about 10 nm.

In one embodiment, the CNTs are functionalized with a thiol group and the cross-linking agent is benzoquinone. During cross-linking, the sulfur atom of the functionalized CNTs reacts with the benzoquinone, resulting in cross-linking of the CNTs.

To form the cross-linked CNTs, the CNTs and the cross-linking agent may be combined in solution with mixing (e.g., stirring). The CNTs and the cross-linking agent may be reacted in solution for a sufficient amount of time for the cross-linking agent to react with the functional group of the CNTs. By way of example only, the CNTs and the cross-linking agent may be reacted for at least about 1 hour, such as for at least about 2 hours, at least about 3 hours, at least about 4 hours, at least about 5 hours, or greater. The CNTs and the cross-linking agent may be reacted with mixing at room temperature (e.g., between about 20° C. and about 25° C.). To increase the rate of reaction, the CNTs and the cross-linking agent may be combined with mixing at an elevated temperature, such as at a temperature of between about 30° C. and about 100° C. The temperature may be greater than about 30° C., greater than about 40° C., greater than about 50° C., greater than about 60° C., greater than about 70° C., greater than about 80° C., or greater than about 90° C. Sonication may, optionally, be used to sufficiently disperse the cross-linking agent and CNTs in the solution. The CNTs and the cross-linking agent may be combined in an appropriate solvent, such as water, an organic solvent, or combinations thereof. The CNTs and cross-linking agent may be present in the solution in approximately stoichiometric amounts, such as between a weight ratio of 10:1 CNTs:cross-linking agent and 1:10 CNTs:cross-linking agent.

As the CNTs and cross-linking agent react, the solution may change to a suspension. After the CNTs and the cross-linking agent have reacted for a sufficient amount of time to cross-link the CNTs, the cross-linked CNTs may be recovered from the suspension. By way of example only, the cross-linked CNTs may be filtered from the suspension and dried. By filtering the cross-linked CNTs, industrially viable amounts of the cross-linked CNTs may be easily produced. The cross-linked CNTs may then be disposed on or applied to the support substrate to form the carbon nanotube mat. The reaction of the CNTs with the cross-linking agent produces cross-linked CNTs having stronger cross-linking abilities than the pi-pi stacking embodiment described above and the electrostatic interactions embodiment described below. Thus, the resulting cross-linked CNTs may be more durable than the cross-linked CNTs produced by other techniques.

In addition to reaction with the cross-linking agent, covalently-bonded CNTs may be produced by cross-linking fluorine-functionalized CNTs. If the CNTs are functionalized with fluorine groups, the CNTs may be cross-linked by reductive defluorination of the fluorine functionalized carbon nanotubes. The fluorinated CNTs may be exposed to UV irradiation, N,N,N'N'-tetramethyl-1,4,-benzenediamine, hydrazine, or other reductive defluorination techniques to generate reactive free radicals on the defluorinated CNTs. The free radicals on the sidewalls of the CNTs may directly cross-link with one another under ambient conditions (ambient temperature and/or ambient pressure), forming the cross-linked CNTs.

The fluorinated CNTs may be cross-linked by reaction with organic diamines, such as ethylenediamine, propylenediamine, butylenediamine, pentamethylenediamine, and hexamethylenediamine, as discussed in U.S. Pat. No. 8,398,950 to Khabashesku, titled "Condensation Polymers Having Covalently Bound Carbon Nanotubes," the contents of which are incorporated herein in their entirety by this reference.

In yet another embodiment, the carbon nanotube mat includes CNTs cross-linked by electrostatic interactions. Metal nanoparticles may generate electrostatic interactions sufficient to hold together the CNTs. The metal nanoparticles may include, but are not limited to, palladium, silver, gold, copper, platinum, ruthenium, rhodium, tin, aluminum, lithium, sodium, potassium, or combinations thereof. The metal nanoparticles may have an average particle size of less than or equal to about 50 nm, less than or equal to about 20 nm, or less than or equal to about 10 nm, such as from greater than or equal to about 1 nm to less than or equal to about 50 nm, from greater than or equal to about 1 nm to less than or equal to about 20 nm, or from greater than or equal to about 1 nm to less than or equal to about 10 nm. Since the CNTs are held together by electrostatic interactions, no cross-linking agent is utilized, increasing the cost-effectiveness and industrial viability of the cross-linked CNTs cross-linked by electrostatic interactions.

In one embodiment, the CNTs are cross-linked with palladium nanoparticles. During cross-linking, the palladium nanoparticles interact with the CNTs, resulting in cross-linking of the CNTs.

To form the cross-linked CNTs, the CNTs and the metal nanoparticles may be combined in solution with mixing (e.g., stirring). The CNTs and the metal nanoparticles may be reacted in solution for a sufficient amount of time for the metal nanoparticles and CNTs to interact. By way of example only, the CNTs and the metal nanoparticles may be combined in solution for at least about 1 hour, such as for at least about 2 hours, at least about 3 hours, at least about 4 hours, at least about 5 hours, or greater. The CNTs and the metal nanoparticles may be combined at room temperature (e.g., between about 20° C. and about 25° C.). To increase the rate of reaction, the CNTs and the metal nanoparticles may be combined with mixing at an elevated temperature, such as at a temperature of between about 30° C. and about 100° C. The temperature may be greater than about 30° C., greater than about 40° C., greater than about 50° C., greater than about 60° C., greater than about 70° C., greater than about 80° C., or greater than about 90° C. Sonication may, optionally, be used to sufficiently disperse metal nanoparticles and CNTs in the solution. The CNTs and the metal nanoparticles may be combined in an appropriate solvent, such as water, an organic solvent, or combinations thereof. The CNTs may be present in the solution in excess compared to the metal nanoparticles, such as at a weight ratio of greater than about 2:1 CNTs:metal nanoparticles, greater than about 5:1 CNTs:metal nanoparticles, or greater than about 10:1 CNTs:metal nanoparticles.

As the CNTs and metal nanoparticles interact, the solution may change to a suspension. After the CNTs and the metal nanoparticles have interacted for a sufficient amount of time to cross-link the CNTs, the cross-linked CNTs may be recovered from the suspension. By way of example only, the cross-linked CNTs may be filtered from the suspension and dried. By filtering the cross-linked CNTs, industrially viable amounts of the cross-linked CNTs may be easily produced. The cross-linked CNTs may then be disposed on (e.g., deposited on or applied to) the support substrate to form the carbon nanotube mat.

Upon forming a cross-linked nanotube mat as described herein above, the carbon nitride nanoparticles may be deposited on and/or in the carbon nanotube mat by passing a solution or suspension including the carbon nitride nanoparticles through the mat.

Figure 5:
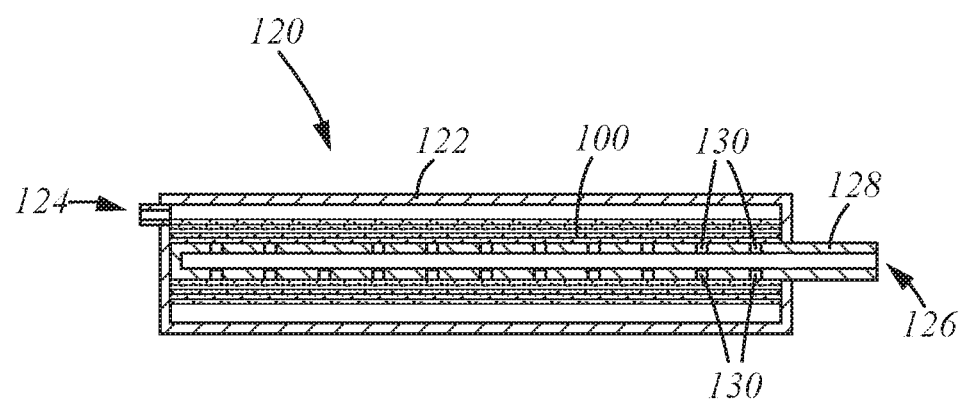
FIG. 5 is a cross-sectional side view of the cartridge filter of FIG. 4.

Embodiments of filter membranes 100 as described hereinabove may be used in filter cartridges for use in filtering contaminated water or other liquid. For example, FIGS. 4 and 5 illustrate an example embodiment of a filter cartridge 120 of the present disclosure. As shown therein, the filter cartridge 120 includes an outer housing 122, a fluid inlet 124 leading into the outer housing, and a fluid outlet 126 leading out from the outer housing 122. The filter cartridge 120 also include a filter membrane 100 as described herein disposed between the fluid inlet 124 and the fluid outlet 126 such that fluid passing through the outer housing 122 between the fluid inlet 124 and the fluid outlet 126 passes through the filter membrane 100.

In the embodiment of FIGS. 4 and 5, the outer housing 122 has an elongated tubular shape, and the filter cartridge 120 comprises an inner tubular member 128 extending longitudinally through the outer housing 122, and the filter membrane 100 is wrapped around the tubular member 128. In some embodiments, the filter membrane 100 may be wrapped around the tubular member 128 any number of times in a spiral configuration. The flexibility of the filter membrane 100 allows the filter membrane 100 to be wrapped around the tubular member 128 without breaking. The fluid inlet 124 leads to a space within the outer housing 122 outside the tubular member 128, and the fluid outlet 126 leads out from a space within the tubular member 128. The tubular member 128 comprises a plurality of apertures 130 extending through the wall thereof, such that fluid to be filtered can flow into the outer housing 122 through the fluid inlet 124, through the filter membrane 100, through the apertures 130 into the interior of the tubular member 128, and out from the filter cartridge 120 through the fluid outlet 126. In other embodiments, the tubular member 128 may be porous and may have an open pore network, such that fluid may flow through the pores in the wall of the tubular member between the exterior and interior of the tubular member. In such embodiments, the tubular member 128 may not include apertures 130.

In some embodiments, additional layers of membranes, filters, and/or screens may be layered together with the filter membrane 100 to improve the filtering process. For example, a spacer layer and a permeate carrier layer may be layered together with the filter membrane 100 and wrapped around the tubular member 128. Furthermore, the filter cartridge 120 may also include an additional fluid outlet leading out from the region within the outer housing 122 outside the tubular member 128 so as to allow retentate liquid including concentrated filtered material to be discharged from the filter cartridge 120.

The spiral wound filter cartridge 120 of FIGS. 4 and 5 is set forth as one non-limiting example of a filter cartridge including a filter membrane 100 as described herein. Many other configurations of filter cartridges are known in the art, and additional embodiments of the present disclosure include other configurations of filter cartridges including filter membranes 100 as described herein.

Liquid may be filtered by passing the liquid through the filter membrane 100 as described herein. Such filter membranes 100 may enable improved filtration performance, while allowing relatively high flux of filtrate through the filter membrane 100. The filter membrane 100 provides a dual filtration mechanism, as contaminants are filtered out by the porous, high-surface area CNTs, while charged ions such as Ba, Ca, Mg, Na, and Zn are filtered out via the carbon nitride nanoparticles. Furthermore, this hybrid filtration mechanism may be especially efficient in filtering divalent cations, such as Zinc. Zinc is toxic to marine organisms at higher concentrations, and there is a need for technology to reduce the Zinc concentration for offshore applications in the oil and gas industry. Furthermore, due to the inherent physical properties of CNTs, the filter membrane 100 exhibits improved high pressure and high temperature stability, and improved chemical corrosion resistance relative to conventional filter membranes employed in filter cartridges. Such filter membranes 100 may be particularly useful for treating flowback water and other waste water and liquids in the oil and gas industry.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A filter membrane, comprising:
carbon nanotubes; and
carbon nitride nanoparticles;
wherein inter-particle atomic interactions between the carbon nanotubes and the carbon nitride nanoparticles bind the carbon nanotubes and the carbon nitride nanoparticles together.

2. The filter membrane of claim 1, wherein the carbon nitride nanoparticles comprise CNx nanoparticles, wherein x is between 0.05 and 1.33, and wherein the carbon nitride nanoparticles comprise triazine rings.

3. The filter membrane of claim 2, wherein the triazine rings comprise 1,3,5-triazine rings.

4. The filter membrane of claim 3, wherein the inter-particle atomic interactions comprise pi-pi stacking interactions between aromatic rings in the carbon nanotubes and the carbon nitride nanoparticles.

5. The filter membrane of claim 4, wherein the carbon nanotubes constitute between about 10% and about 90% by weight of the filter membrane.

6. The filter membrane of claim 5, wherein the carbon nitride nanoparticles constitute between about 1% and about 90% by weight of the filter membrane.

7. The filter membrane of claim 6, wherein the filter membrane consists essentially of the carbon nanotubes and the carbon nitride nanoparticles.

8. The filter membrane of claim 6, wherein the filter membrane has a thickness of between about one micron (1 μm) and about fifty microns (50 μm).

9. The filter membrane of claim 6, wherein the carbon nanotubes are cross-linked with one another.

10. The filter membrane of claim 1, wherein the inter-particle atomic interactions comprise pi-pi stacking interactions between aromatic rings in the carbon nanotubes and the carbon nitride nanoparticles.

11. The filter membrane of claim 1, wherein the carbon nanotubes constitute between about 10% and about 90% by weight of the filter membrane.

12. The filter membrane of claim 1, wherein the carbon nitride nanoparticles constitute between about 10% and about 90% by weight of the filter membrane.

13. The filter membrane of claim 1, wherein the filter membrane consists essentially of the carbon nanotubes and the carbon nitride nanoparticles.

14. The filter membrane of claim 1, wherein the filter membrane has a thickness of between about one micron (1 μm) and about fifty microns (50 μm).

15. The filter membrane of claim 1, wherein the carbon nanotubes are cross-linked with one another.

16. The filter membrane of any claim 1, wherein the filter membrane is flexible.

17. A filter cartridge, comprising:
an outer housing;
a fluid inlet leading into the outer housing;
a fluid outlet leading out from the outer housing; and
a filter membrane disposed between the fluid inlet and the fluid outlet and located such that fluid passing through the outer housing between the fluid inlet and the fluid outlet passes through the filter membrane, the filter membrane comprising carbon nanotubes and carbon nitride nanoparticles, wherein inter-particle atomic interactions between the carbon nanotubes and the carbon nitride nanoparticles bind the carbon nanotubes and the carbon nitride nanoparticles together.

18. The filter cartridge of claim 17, further comprising a porous or perforated tubular member disposed within the outer housing, and wherein the filter membrane is wrapped around the tubular member, one of the fluid inlet and the fluid outlet leads to a space within the outer housing outside the tubular member, and another of the fluid inlet and the fluid outlet leads to a space within the tubular member.

19. A method of making a filter membrane, comprising:
dispersing carbon nanotubes and carbon nitride nanoparticles in a liquid to form a suspension;
passing the suspension through a filter so as to deposit the carbon nanotubes and the carbon nitride nanoparticles on the filter and form a filter membrane on the filter, the filter membrane comprising the carbon nanotubes and the carbon nitride nanoparticles, wherein inter-particle atomic interactions between the carbon nanotubes and the carbon nitride nanoparticles bind the carbon nanotubes and the carbon nitride nanoparticles together.

20. A method of filtering a liquid, comprising passing the liquid through a filter membrane comprising carbon nanotubes and carbon nitride nanoparticles, wherein inter-particle atomic interactions between the carbon nanotubes and the carbon nitride nanoparticles bind the carbon nanotubes and the carbon nitride nanoparticles together.

* * * * *